United States Patent
Dellinger et al.

(10) Patent No.: US 12,062,774 B2
(45) Date of Patent: Aug. 13, 2024

(54) BATTERIES INCORPORATING SILICA FIBERS

(71) Applicant: American Nano, LLC, Clemmons, NC (US)

(72) Inventors: Mitch Dellinger, Clemmons, NC (US); Surya Raj Banks, Clemmons, NC (US)

(73) Assignee: American Nano LLC., Clemmons, NC (US)

( * ) Notice: Subject to any disclaimer, the term of this patent is extended or adjusted under 35 U.S.C. 154(b) by 0 days.

(21) Appl. No.: 18/196,074

(22) Filed: May 11, 2023

(65) Prior Publication Data

US 2023/0282801 A1   Sep. 7, 2023

Related U.S. Application Data

(63) Continuation of application No. 17/712,384, filed on Apr. 4, 2022, now Pat. No. 11,688,846, which is a continuation of application No. 16/422,100, filed on May 24, 2019, now Pat. No. 11,335,897.

(60) Provisional application No. 62/676,435, filed on May 25, 2018.

(51) Int. Cl.
| | |
|---|---|
| *H01M 4/04* | (2006.01) |
| *H01M 4/62* | (2006.01) |
| *H01M 10/052* | (2010.01) |
| *H01M 50/449* | (2021.01) |
| *H01M 50/457* | (2021.01) |

(52) U.S. Cl.
CPC ......... *H01M 4/0469* (2013.01); *H01M 4/621* (2013.01); *H01M 4/625* (2013.01); *H01M 10/052* (2013.01); *H01M 50/449* (2021.01); *H01M 50/457* (2021.01)

(58) Field of Classification Search
CPC ............ H01M 4/0469; H01M 50/457; H01M 50/449; H01M 4/621; H01M 4/625; H01M 10/052
See application file for complete search history.

(56) References Cited

U.S. PATENT DOCUMENTS

| | | |
|---|---|---|
| 6,485,856 B1 | 11/2002 | Brown et al. |
| 2012/0264020 A1 | 10/2012 | Burton et al. |
| 2013/0017450 A1 | 1/2013 | Nakatani et al. |

(Continued)

FOREIGN PATENT DOCUMENTS

| | | |
|---|---|---|
| CN | 105406006 | 3/2016 |
| JP | 2001-273900 A | 10/2001 |

(Continued)

OTHER PUBLICATIONS

Esfahani, et al., "Electrospun ceramic nanofiber mats today: Synthesis, properties, and applications", Materials, 2017, vol. 10, No. 11, Article No. 1238, Internal pp. 1-43.

(Continued)

*Primary Examiner* — Brian R Ohara
*Assistant Examiner* — Patrick Marshall Greene
(74) *Attorney, Agent, or Firm* — Morgan, Lewis & Bockius LLP

(57) ABSTRACT

Embodiments of the invention include batteries and other charge-storage devices incorporating sheets and/or powders of silica fibers and methods for producing such devices. The silica fibers may be formed via electrospinning of a sol gel produced with a silicon alkoxide reagent, such as tetraethyl ortho silicate, alcohol solvent, and an acid catalyst.

20 Claims, 7 Drawing Sheets

(56) References Cited

U.S. PATENT DOCUMENTS

| | | |
|---|---|---|
| 2015/0099185 A1 | 4/2015 | Joo et al. |
| 2015/0257263 A1 | 9/2015 | Sethumadhavan et al. |
| 2016/0053090 A1 | 2/2016 | Kosaka et al. |
| 2017/0194630 A1 | 7/2017 | Ozkan et al. |
| 2017/0200948 A1 | 7/2017 | Kon Do et al. |
| 2018/0090749 A1 | 3/2018 | Yu et al. |
| 2019/0006638 A1 | 1/2019 | Bayer et al. |
| 2019/0081316 A1 | 3/2019 | Zoitos et al. |
| 2019/0237765 A1 | 8/2019 | Brown et al. |
| 2019/0270220 A1 | 9/2019 | Oguchi et al. |
| 2019/0363341 A1 | 11/2019 | Dellinger et al. |
| 2020/0203675 A1 | 6/2020 | Lin et al. |
| 2021/0005858 A1 | 1/2021 | Kim et al. |

FOREIGN PATENT DOCUMENTS

| | | |
|---|---|---|
| JP | 2010-055761 A | 3/2010 |
| JP | 2014-034739 A | 2/2014 |
| KR | 1020140046137 | 4/2014 |
| KR | 1020150100461 | 9/2015 |

OTHER PUBLICATIONS

International Search Report and Written Opinions for International Application No. PCT/US2019/033927, dated Sep. 18, 2019, 12 pages.

BATTERIES INCORPORATING SILICA FIBERS

RELATED APPLICATIONS

This application is a continuation of U.S. patent application Ser. No. 17/712,384, filed Apr. 4, 2022, which is a continuation of U.S. patent application Ser. No. 16/422,100, filed May 24, 2019, which claims the benefit of and priority to U.S. Provisional Patent Application No. 62/676,435, filed May 25, 2018, the entire disclosure of each of which is hereby incorporated herein by reference.

TECHNICAL FIELD

In various embodiments, the present invention relates to charge-storage devices incorporating silica fibers.

BACKGROUND

Batteries have been utilized for electrochemical energy storage for hundreds of years, and they have increasingly become ubiquitous, particularly as microelectronic miniaturization has enabled the widespread adoption of many different types of consumer electronics. As next-generation electronics become increasingly lightweight and even flexible, the demands on battery technology have only accelerated. Various technologies for flexible batteries have been proposed, but the implementation of such technologies has been hampered by poor reliability, low charge-storage capacity, or low charge/discharge rates. In addition, various battery technologies are based on exotic and expensive materials, which are frequently toxic, thereby establishing another barrier to adoption.

In contrast, silicon dioxide, i.e., silica, is one of the most abundant materials on Earth, being the major component of most types of sand. Silica has several advantageous properties that have resulted in its use in many different industries and products. For example, the high electrical resistance of silica has enabled its use as a high-performance insulator in microelectronic devices, e.g., as the gate-dielectric material in field-effect transistors. Silica is also utilized in the production of glass usable in many different applications. Optical fibers, for example, are fabricated utilizing silica and have enabled the formation and growth of worldwide optical telecommunications networks. Silica has also been utilized at the microscopic scale, as silica particles have been utilized as abrasive agents, as desiccants, and to form molds for investment casting of metallic materials. However, silica has yet to be utilized as a material in batteries and other charge-storage devices (e.g., supercapacitors). Utilization of silica may enable the fabrication of and use of batteries that are more friendly to the environment and that may be utilized to satisfy the requirements of next-generation electronic devices.

SUMMARY

In accordance with various embodiments of the present invention, silica fibers and/or powder formed therefrom are utilized as the structural matrix for various components of a battery or other charge-storage device. Various components of the battery incorporate other materials mixed with, applied to, and/or incorporated within the silica fibers in order to enable electrochemical charge storage and conductivity of the battery. The silica fibers themselves may be produced from a gelatinous material that is electrospun to form a fiber mat. The mat itself (or a portion thereof) may be utilized within the battery, with or without additional processing (e.g., pressing and/or incorporation of an additive material). In various embodiments, the mat is fragmented into a powder or dust, which may include, consist essentially of, or consist of fibrous fragments. The powder, which may already incorporate one or more additive materials introduced before, during, or after the fiber electrospinning process, may be utilized in one or more regions of the batteries. In various embodiments, the powder is mixed with one or more additives for use in one or more battery regions. In other embodiments, the powder is pressed into a planar sheet and utilized within the battery, with or without the incorporation of one or more additives.

In various embodiments, the silica fibers may be prepared by electrospinning a sol-gel, which may be prepared with a silicon alkoxide reagent, such as tetraethyl ortho silicate (TEOS), alcohol solvent, and an acid catalyst. In various embodiments, the sol-gel is produced via ripening of sol under controlled environmental conditions, and/or the properties of the sol or sol-gel during the ripening process are monitored, in order to identify various processing windows during which the electrospinning of the sol-gel may be successfully performed. As known in the art, a "sol" is a colloidal solution that gradually evolves towards the formation of a "gel," i.e., a diphasic system containing both a liquid phase and solid phase. Herein, the term "sol-gel" is used to refer to the gel produced from the sol-gel process that may be electrospun into fibers or a fibrous mat.

In various embodiments, the controlled environment for ripening the sol may involve controlled conditions in terms of humidity, temperature, and optionally barometric pressure. For example, the humidity may be controlled within the range of about 30% to about 90%, and the temperature may be controlled within the range of from about 50° F. to about 90° F. By controlling the environmental conditions during ripening, the gel may be electrospun during the time when spinning is optimal, which can occur in a very small window of only several minutes if the ripening process is accelerated by direct heat. When ripening the sol at a constant humidity in the range of about 50% to 80% and a temperature of about 60 to 80° F., the sol will ripen (gelatinize) in a few days, and the window for successful electrospinning may be expanded to at least several hours, and in some embodiments several days. The sol may therefore be ripened in an enclosure which may include one or more environmental monitors, such as a temperature reading device and/or a humidity reading device. Further, gases produced or released by the sol during the ripening process and/or relative weight of the sol may be monitored to determine a suitable or optimal time for electrospinning.

Once the sol is adequately ripened into a sol-gel, it is electrospun to form a mat of entangled silica fibers. Once electrospun, the silica fibers may have a variable diameter, such as in the range of from about 50 nm to 5 µm. In some embodiments, the fibers are predominately in the range of about 100 nm to about 2 µm, or predominately in the range of about 200 to about 1000 nm. For fabrication of various regions of the battery, different materials may be applied to the silica fibers during and/or after the electrospinning process in order to imbue the resulting fibers, fiber mats, or powder with different properties. For example, a carbon additive such as graphene, amorphous carbon, and/or graphite may be applied to the sol-gel and/or to the electrospun or electrospinning silica fibers; such fibers may be utilized in and/or fragmented into a powder for use in the battery anode. Similarly, a lithium additive (for example, a lithium metal oxide (e.g., a lithium transition metal oxide such as lithium cobalt oxide or lithium manganese oxide) or a lithium metal phosphate (e.g., lithium iron phosphate) to the sol-gel and/or to the electrospun or electrospinning silica fibers; such fibers may be utilized in and/or fragmented into a powder for use in the battery cathode. Exemplary lithium additives in accordance with embodiments of the present invention include lithium metal oxides such as lithium cobalt oxide, and/or lithium manganese oxide, and/or lithium metal phosphates such as lithium iron phosphate. In various embodiments, lithium additives include, consist essentially of, or consist of lithium metal oxide salts such as $LiNiMnCoO_2$ (NMC), $LiNiCoAlO_2$ (NCA), $LiCoO_2$ (LCO), $LiFePO_4$ (LFP), etc.

In various embodiments, additives such as the carbon additive and/or the lithium additive may be incorporated into (e.g., mixed with) powder formed via fragmentation of the electrospun fibers. In various embodiments, the anode region may include, consist essentially of, or consist of silica fiber powder, present at, e.g., approximately 0.5% to approximately 90% (or approximately 0.5% to approximately 50%, or approximately 0.5% to approximately 10%) by weight or volume, mixed with the carbon additive (e.g., as the balance). In various embodiments, the cathode region may include, consist essentially of, or consist of silica fiber powder, present at, e.g., approximately 0.5% to approximately 90% (or approximately 0.5% to approximately 50%, or approximately 0.5% to approximately 10%) by weight or volume, mixed with the lithium additive (e.g., as the balance). Cathode regions in accordance with embodiments of the invention may also incorporate a carbon additive such as amorphous and/or graphitic carbon.

Batteries in accordance with embodiments of the invention may also incorporate separator layers that (1) prevent or substantially retard physical contact between the anode and cathode regions and (2) incorporate an electrolyte that enables charge transfer between the anode and cathode regions through the separator. In various embodiments, the separator incorporates an electrolyte such as a mixture of an organic solvent (e.g., ethylene, dimethyl/ethyl carbonates, and/or N-methyl-2-pyrrolidone) with one or more lithium salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), or lithium triflate ($LiCF_3SO_3$). In various embodiments, the separator includes, consists essentially of, or consists of a polymeric layer that is typically porous to enable charge transfer (e.g., via flow of ionic charge carriers). For example, pores in the polymeric layer may range in size from approximately 5 nm to approximately 100 nm. Such polymeric layers may include, consist essentially of, or consist of, for example, one or more polymeric materials such as polyethylene, polypropylene, polytetrafluoroethylene, polyvinyl chloride, and/or polymer blends including one or more of these with or without one or more other polymeric materials.

In various embodiments, separator layers may additionally incorporate one or more sheets of silica fibers. As utilized herein, a "sheet" of silica fibers refers to an electrospun mat of silica fibers, with or without additional pressing or processing, or to pressed layers of powder (e.g., fibrous fragments) formed via fragmentation of electrospun silica fiber mats. For example, a first sheet of silica fibers may be disposed between (and, e.g., in direct mechanical contact with) the polymeric layer and the anode region, and/or a second sheet of silica fibers may be disposed between (and, e.g., in direct mechanical contact with) the polymeric layer and the cathode region. In various embodiments, the incorporation of one or more sheets of silica fibers provides the polymer layer with protection from thermal decomposition and/or deformation, enhances mechanical integrity of the structure inside the battery, and/or improves ion mobility within the battery.

In various embodiments, for example those incorporating one or more sheets of silica fibers as portions of the separator, the battery may be substantially free of silica fibers and/or silica fiber powder within the anode region and/or the cathode region. In various embodiments, the battery may incorporate silica fibers and/or silica fiber powder in the anode region, the cathode region, or both.

Various embodiments of the invention include batteries incorporating multiple anode-separator-cathode stacks electrically connected to each other in series or in parallel; such batteries may exhibit increased charge-storage capabilities. As utilized herein, in a region of a battery "incorporating" an additive material such as one of the various materials listed above and herein (e.g., a carbon additive and/or a lithium additive) in or on the region (e.g., in or on the silica fibers and/or silica fiber powder), the additive material may be bonded to or otherwise adhered to in a substantially solid form to the fibers or powder particles, present within the crystalline structure of the fibers or powder particles themselves, and/or present within a mat or sheet (e.g., within pores or spaces between fibers) or within a collection of powder particles as a solid or in liquid form (e.g., with a liquid binder or carrier such an organic liquid such as propylene carbonate and/or other organic polymers mentioned herein).

Various battery regions in accordance with the embodiments of the invention (e.g., cathode regions, anode regions, and/or electrolyte/separator regions) may include a binder material (e.g., polyvinylidene difluoride (PVDF), carboxymethyl cellulose (CMC), styrene-butadiene rubber (SBR), etc.) and/or a solvent (e.g., any of the organic liquids disclosed herein, N-methyl-2-pyrrolidone (NMP), ethylene carbonate (EC), ethylmethylcarbonate (EMC), diethyl carbonate (DEC), dimethyl carbonate (DMC), etc.). Such materials may be utilized when various battery regions (e.g., cathode regions and/or anode regions) are fabricated (e.g., to form homogenous slurries of the desired materials) and may be substantially removed prior to or during final assembly of the battery. Thus, in one or more regions of the battery, only trace, or unintentional, amounts of the binder and/or solvent may remain. In various embodiments, anode and/or cathode regions may include one or more metallic solid regions (e.g., metal sheets or foils) that may help ensure electrical contact between the anode and/or cathode regions and electrodes (e.g., portions of an external case) of the battery. For example, an anode and/or cathode region may include a base layer including, consisting essentially of, or consisting of one or more metal sheets or foils that may include, consist essentially of, or consist of, e.g., copper and/or aluminum.

Batteries in accordance with embodiments of the present invention may have any of a variety of shapes and sizes. For example, batteries in accordance with embodiments of the invention may have the form factor of commercially available batteries such as "coin cells" (e.g., LIR 2032, etc.), button cells (e.g., 1220, 1254, 1632, 2050, 2477, etc.), or cylindrical cells (e.g., 14430-18650, AA, AAA, etc.). Batteries in accordance with embodiments of the invention may be cylindrical in shape and may have a range of different dimensions. For example, diameters of batteries in accordance with embodiments of the invention may range from approximately 10 mm to approximately 50 mm. Heights of batteries in accordance with embodiments of the invention may range from approximately 2 mm to approximately 100 mm. Batteries in accordance with embodiments of the invention may have dimensions (e.g., diameters and/or heights) larger than those listed above.

Batteries in accordance with embodiments of the invention feature one or more of the following advantages when compared to conventional batteries: improved ion mobility (due to, e.g., greater porosity), higher charge density, greater temperature stability (e.g., structural stability and/or charge/discharge rate variance under extreme temperatures (e.g., beyond −20° C. and/or 45° C.)), improved utilization of active materials (e.g., cathode and/or anode materials) for equivalent performance levels, improved reversible capacity, and longer shelf life. For example, coin-cell batteries in accordance with embodiments of the invention (e.g., batteries incorporating $LiCoO_2$ within the cathode) may have nominal voltages ranging between approximately 3 V and approximately 4 V (e.g., approximately 3.7 V), maximum capacities greater than 40 mAh, volumetric energy densities greater than 149 Wh/L, specific energies greater than 56 Wh/kg, constant charge currents and/or maximum continuous discharge currents greater than 0.04 A, self-discharge rates of less than 1%/year, and/or cycle lives of greater than 500 cycles at 0.2 C mA discharge. In other examples, cylindrical batteries in accordance with embodiments of the invention (e.g., batteries incorporating $LiNiMnCoO_2$ within the cathode) may have nominal voltages ranging between approximately 3 V and approximately 4 V (e.g., approximately 3.7 V), maximum capacities greater than 3500 mAh, volumetric energy densities greater than 738 Wh/L, specific energies greater than 261 Wh/kg, constant charge currents greater than 1.7 A, maximum continuous discharge currents greater than 10 A, self-discharge rates of less than 1%/year, and/or cycle lives of greater than 300-500 cycles at 0.2 C mA discharge.

Various embodiments of the invention have advantageous properties when utilized as batteries and other charge-storage devices. For example, the sheets of silica fibers and/or silica fiber powder will limit the thermal expansion of various additives (e.g., lithium additives) utilized in various embodiments. Lithium has a large coefficient of thermal expansion that can lead to reliability issues during operation of conventional lithium ion batteries as the temperature of lithium-containing regions increase and decrease. The silica fiber-based structures (e.g., sheets and/or powders) of batteries in accordance with embodiments of the present invention provide sufficient porosity to accommodate thermal cycling of additive-containing layers without appreciable deformation of the battery itself.

In addition, the silica fiber-based structures utilized in the various regions or structures of batteries in accordance with embodiments of the invention have a large surface area (e.g., ranging from approximately 50 m²/gram to approximately 100 m²/gram, or even larger), thereby enabling a large charge storage capacity. The silica fiber-based structures are also advantageously thermally insulating and thus will thermally shield the various regions of the battery from extreme environmental conditions, thereby increasing the lifetime of the battery.

Batteries in accordance with embodiments of the present invention may be utilized in any of a number of different applications, e.g., consumer applications such as personal electronics, centralized electric energy storage units for portable devices, power supply units, and military and space applications.

In various embodiments of the invention, one or more regions of the battery include, consist essentially of, or consist of silica fiber powder (with or without an additive). For example, in various embodiments, once a silica fiber mat is successfully electrospun, it may be processed into a powder or dust. For example, the electrospun mat may be "fragmented," i.e., fractured, cut, ground, milled (e.g., in a ball mill or other milling device), pulverized, or otherwise divided into small fragments that maintain a fibrous structure. As used herein, the term "fibrous fragments" (or "fibrous-mat fragments," or simply "fragments") refers to small particles, parts, or flakes of a fibrous mat having an average dimension larger (e.g., 5×, 10×, or even 100×) than the width of at least some of the fibers of the mat. In various embodiments, the average size of a fibrous fragment is in the range of approximately 20 µm to approximately 200 µm. Fibrous fragments may thus resemble microscopic-scale versions of the electrospun mat itself, e.g., intertwined collections of silica fibers, and thus typically are porous and have low densities. Thus, fibrous fragments may be contrasted with other types of micro-scale particles, such as the substantially spherical particles used in colloidal silica, which are each unitary, individual units or grains, rather than small collections of fibers. Various portions of a fibrous fragment (e.g., the edges) may have sharp and/or broken edges resulting from the fracturing process utilized to form the fragments from the electrospun mat. As utilized herein, the terms "silica fiber powder," "silica powder," "silica dust," and "fiber dust" include collections of particles generated via the fragmentation of electrospun fiber mats and/or fibers, and may include fibrous fragments and/or other powder particles resulting from such fragmentation.

Embodiments of the present invention may employ silica fibers, fragments thereof, and/or mixtures incorporating such fibers or fragments, and/or methods for fabricating such fibers or fragments detailed in U.S. patent application Ser. No. 15/934,599, filed on Mar. 23, 2018 (issued as U.S. Pat. No. 10,111,783), U.S. patent application Ser. No. 16/131,531, filed on Sep. 14, 2018, U.S. patent application Ser. No. 16/353,181, filed on Mar. 14, 2019, and U.S. patent application Ser. No. 16/367,313, filed on Mar. 28, 2019, the entire disclosure of each of which is incorporated by reference herein.

In an aspect, embodiments of the invention feature a charge-storage device that includes, consists essentially of, or consists of an anode region, a cathode region, and a separator disposed between the anode region and the cathode region. The anode region includes, consists essentially of, or consists of a first silica fiber powder and a carbon additive. The cathode region includes, consists essentially of, or consists of a second silica fiber powder and a lithium additive. The separator contains an electrolyte material.

Embodiments of the invention may include one or more of the following in any of a variety of combinations. The carbon additive may include, consist essentially of, or consist of graphene, amorphous carbon, and/or graphite. The lithium additive may include, consist essentially of, or consist of a lithium metal oxide and/or a lithium metal phosphate. The electrolyte material may include, consist essentially of, or consist of an organic solvent and a lithium salt. The electrolyte material may include, consist essentially of, or consist of a lithium salt.

The separator may include, consist essentially of, or consist of (i) one or more sheets of silica fibers, and (ii) a polymeric layer. The separator may include, consist essentially of, or consist of (i) a first sheet of silica fibers, (ii) a second sheet of silica fibers, and (iii) a polymeric layer disposed between the first and second sheets of silica fibers. The one or more sheets of silica fibers may be formed at least in part by electrospinning a sol-gel. The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 10 days, and for 2 days to 7 days in some embodiments. The sol-gel may be electrospun when the weight is at from 20% to 40% of the starting weight of the initial sol or sol-gel before ripening (transitioning). The sol-gel may be electrospun when the production of ethylene vapor is 10% to 20% relative to the peak production of ethylene vapors during ripening (transitioning) of the initial sol or sol-gel before ripening. The sol-gel may be electrospun when the production of ethylene vapor therefrom is 10% to 40% relative to the initial sol or sol-gel before ripening (transitioning).

The first silica fiber powder may be formed by a process including, consisting essentially of, or consisting of (i) electrospinning a sol-gel to form a mat of silica fibers, and (ii) fragmenting the mat to form silica fiber powder. The silica fiber powder may include, consist essentially of, or consist of particles and/or fibrous fragments that may have an average size (e.g., average diameter, length, width, or other dimension) ranging from approximately 20 μm to approximately 200 μm. The silica fiber powder may include, consist essentially of, or consist of a plurality of fibrous fragments each composed of a plurality of silica fibers or portions thereof. The fibers or portions thereof within the silica fiber powder may have a variable diameter of from about 50 nm to about 5 μm. The fibers or portions thereof within the silica fiber powder may have a variable diameter of from about 200 nm to about 1000 nm. The silica fiber powder may consist essentially of or consist of $SiO_2$.

The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

The process of forming the first silica fiber powder may include incorporating the carbon additive into the sol-gel before electrospinning thereof, whereby the silica fiber mat includes the carbon additive incorporated therewithin. The process of forming the first silica fiber powder may include incorporating the carbon additive onto the silica fibers during electrospinning thereof. The process of forming the first silica fiber powder may include incorporating the carbon additive onto the mat of silica fibers prior to fragmentation thereof. The process of forming the first silica fiber powder may include, after fragmentation of the silica fiber mat, incorporating the carbon additive onto the silica fiber powder.

The second silica fiber powder may be formed by a process including, consisting essentially of, or consisting of (i) electrospinning a sol-gel to form a mat of silica fibers, and (ii) fragmenting the mat to form silica fiber powder. The silica fiber powder may include, consist essentially of, or consist of particles and/or fibrous fragments that may have an average size (e.g., average diameter, length, width, or other dimension) ranging from approximately 20 μm to approximately 200 μm. The silica fiber powder may include, consist essentially of, or consist of a plurality of fibrous fragments each composed of a plurality of silica fibers or portions thereof. The fibers or portions thereof within the silica fiber powder may have a variable diameter of from about 50 nm to about 5 μm. The fibers or portions thereof within the silica fiber powder may have a variable diameter of from about 200 nm to about 1000 nm. The silica fiber powder may consist essentially of or consist of $SiO_2$.

The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water.

The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

The process of forming the second silica fiber powder may include incorporating the lithium additive into the sol-gel before electrospinning thereof, whereby the silica fiber mat includes the lithium additive incorporated therewithin. The process of forming the second silica fiber powder may include incorporating the lithium additive onto the silica fibers during electrospinning thereof. The process of forming the second silica fiber powder may include incorporating the lithium additive onto the mat of silica fibers prior to fragmentation thereof. The process of forming the second silica fiber powder may include, after fragmentation of the silica fiber mat, incorporating the lithium additive onto the silica fiber powder.

In another aspect, embodiments of the invention feature a method of fabricating a charge-storage device. An anode region is formed. A cathode region is formed. A separator is disposed between the anode region and the cathode region. The anode region includes, consists essentially of, or consists of a first silica fiber powder and a carbon additive. The cathode region includes, consists essentially of, or consists of a second silica fiber powder and a lithium additive. The separator contains an electrolyte material.

Embodiments of the invention may include one or more of the following in any of a variety of combinations. The carbon additive may include, consist essentially of, or consist of graphene, amorphous carbon, and/or graphite. The lithium additive may include, consist essentially of, or consist of a lithium metal oxide and/or a lithium metal phosphate. The electrolyte material may include, consist essentially of, or consist of an organic solvent and a lithium salt. The electrolyte material may include, consist essentially of, or consist of a lithium salt.

The separator may include, consist essentially of, or consist of (i) one or more sheets of silica fibers, and (ii) a polymeric layer. The separator may include, consist essentially of, or consist of (i) a first sheet of silica fibers, (ii) a second sheet of silica fibers, and (iii) a polymeric layer disposed between the first and second sheets of silica fibers. The one or more sheets of silica fibers may be formed at least in part by electrospinning a sol-gel. The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 10 days, and for 2 days to 7 days in some embodiments. The sol-gel may be electrospun when the weight is at from 20% to 40% of the starting weight of the initial sol or sol-gel before ripening (transitioning). The sol-gel may be electrospun when the production of ethylene vapor is 10% to 20% relative to the peak production of ethylene vapors during ripening (transitioning) of the initial sol or sol-gel before ripening. The sol-gel may be electrospun when the production of ethylene vapor therefrom is 10% to 40% relative to the initial sol or sol-gel before ripening (transitioning).

Forming the anode region may include, consist essentially of, or consist of (i) electrospinning a sol-gel to form a mat of silica fibers, and (ii) fragmenting the mat to form silica fiber powder. The silica fiber powder may include, consist essentially of, or consist of particles and/or fibrous fragments that may have an average size (e.g., average diameter, length, width, or other dimension) ranging from approximately 20 µm to approximately 200 µm. The silica fiber powder may include, consist essentially of, or consist of a plurality of fibrous fragments each composed of a plurality of silica fibers or portions thereof. The fibers or portions thereof within the silica fiber powder may have a variable diameter of from about 50 nm to about 5 µm. The fibers or portions thereof within the silica fiber powder may have a variable diameter of from about 200 nm to about 1000 nm. The silica fiber powder may consist essentially of or consist of $SiO_2$.

The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Forming the anode region may include incorporating the carbon additive into the sol-gel before electrospinning thereof, whereby the silica fiber mat includes the carbon additive incorporated therewithin. Forming the anode region may include incorporating the carbon additive onto the silica fibers during electrospinning thereof. Forming the anode region may include incorporating the carbon additive onto the mat of silica fibers prior to fragmentation thereof. Forming the anode region may include, after fragmentation of the silica fiber mat, incorporating the carbon additive onto the silica fiber powder.

Forming the cathode region may include, consist essentially of, or consist of (i) electrospinning a sol-gel to form a mat of silica fibers, and (ii) fragmenting the mat to form silica fiber powder. The silica fiber powder may include, consist essentially of, or consist of particles and/or fibrous fragments that may have an average size (e.g., average diameter, length, width, or other dimension) ranging from approximately 20 μm to approximately 200 μm. The silica fiber powder may include, consist essentially of, or consist of a plurality of fibrous fragments each composed of a plurality of silica fibers or portions thereof. The fibers or portions thereof within the silica fiber powder may have a variable diameter of from about 50 nm to about 5 μm. The fibers or portions thereof within the silica fiber powder may have a variable diameter of from about 200 nm to about 1000 nm. The silica fiber powder may consist essentially of or consist of $SiO_2$.

The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Forming the cathode region may include incorporating the lithium additive into the sol-gel before electrospinning thereof, whereby the silica fiber mat includes the lithium additive incorporated therewithin. Forming the cathode region may include incorporating the lithium additive onto the silica fibers during electrospinning thereof. Forming the cathode region may include incorporating the lithium additive onto the mat of silica fibers prior to fragmentation thereof. Forming the cathode region may include, after fragmentation of the silica fiber mat, incorporating the lithium additive onto the silica fiber powder.

In yet another aspect, embodiments of the invention feature a charge-storage device that includes, consists essentially of, or consists of an anode region, a cathode region, and a separator disposed between the anode region and the cathode region. The anode region includes, consists essentially of, or consists of carbon. The cathode region includes, consists essentially of, or consists of lithium. The separator contains an electrolyte material. The separator includes, consists essentially of, or consists of (i) one or more sheets of silica fibers, and (ii) a polymeric layer.

Embodiments of the invention may include one or more of the following in any of a variety of combinations. The carbon additive may include, consist essentially of, or consist of graphene, amorphous carbon, and/or graphite. The lithium additive may include, consist essentially of, or consist of a lithium metal oxide and/or a lithium metal phosphate. The electrolyte material may include, consist essentially of, or consist of an organic solvent and a lithium salt. The electrolyte material may include, consist essentially of, or consist of a lithium salt. The separator may include, consist essentially of, or consist of (i) a first sheet of silica fibers, (ii) a second sheet of silica fibers, and (iii) a polymeric layer disposed between the first and second sheets of silica fibers.

The one or more sheets of silica fibers may be formed at least in part by electrospinning a sol-gel. The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 10 days, and for 2 days to 7 days in some embodiments. The sol-gel may be electrospun when the weight is at from 20% to 40% of the starting weight of the initial sol or sol-gel before ripening (transitioning). The sol-gel may be electrospun when the production of ethylene vapor is 10% to 20% relative to the peak production of ethylene vapors during ripening (transitioning) of the initial sol or sol-gel before ripening. The sol-gel may be electrospun when the production of ethylene vapor therefrom is 10% to 40% relative to the initial sol or sol-gel before ripening (transitioning).

The anode material may include, consist essentially of, or consist of a first silica fiber powder and a carbon additive. The first silica fiber powder may be formed by a process including, consisting essentially of, or consisting of (i) electrospinning a sol-gel to form a mat of silica fibers, and (ii) fragmenting the mat to form silica fiber powder. The silica fiber powder may include, consist essentially of, or consist of particles and/or fibrous fragments that may have an average size (e.g., average diameter, length, width, or other dimension) ranging from approximately 20 μm to approximately 200 μm. The silica fiber powder may include, consist essentially of, or consist of a plurality of fibrous fragments each composed of a plurality of silica fibers or portions thereof. The fibers or portions thereof within the silica fiber powder may have a variable diameter of from about 50 nm to about 5 μm. The fibers or portions thereof within the silica fiber powder may have a variable diameter of from about 200 nm to about 1000 nm. The silica fiber powder may consist essentially of or consist of $SiO_2$.

The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

The process of forming the first silica fiber powder may include incorporating the carbon additive into the sol-gel before electrospinning thereof, whereby the silica fiber mat includes the carbon additive incorporated therewithin. The process of forming the first silica fiber powder may include incorporating the carbon additive onto the silica fibers during electrospinning thereof. The process of forming the first silica fiber powder may include incorporating the carbon additive onto the mat of silica fibers prior to fragmentation thereof. The process of forming the first silica fiber powder may include, after fragmentation of the silica fiber mat, incorporating the carbon additive onto the silica fiber powder.

The cathode material may include, consist essentially of, or consist of a second silica fiber powder and a lithium additive. The second silica fiber powder may be formed by a process including, consisting essentially of, or consisting of (i) electrospinning a sol-gel to form a mat of silica fibers, and (ii) fragmenting the mat to form silica fiber powder. The silica fiber powder may include, consist essentially of, or consist of particles and/or fibrous fragments that may have an average size (e.g., average diameter, length, width, or other dimension) ranging from approximately 20 μm to approximately 200 μm. The silica fiber powder may include, consist essentially of, or consist of a plurality of fibrous fragments each composed of a plurality of silica fibers or portions thereof. The fibers or portions thereof within the silica fiber powder may have a variable diameter of from about 50 nm to about 5 μm. The fibers or portions thereof within the silica fiber powder may have a variable diameter of from about 200 nm to about 1000 nm. The silica fiber powder may consist essentially of or consist of $SiO_2$.

The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

The process of forming the second silica fiber powder may include incorporating the lithium additive into the sol-gel before electrospinning thereof, whereby the silica fiber mat includes the lithium additive incorporated therewithin. The process of forming the second silica fiber powder may include incorporating the lithium additive onto the silica fibers during electrospinning thereof. The process of forming the second silica fiber powder may include incorporating the lithium additive onto the mat of silica fibers prior to fragmentation thereof. The process of forming the second silica fiber powder may include, after fragmentation of the silica fiber mat, incorporating the lithium additive onto the silica fiber powder.

In another aspect, embodiments of the invention feature a method of fabricating a charge-storage device. An anode region is formed. A cathode region is formed. A separator is disposed between the anode region and the cathode region. The anode region includes, consists essentially of, or consists of an anode material. The anode material includes, consists essentially of, or consists of carbon. The cathode region includes, consists essentially of, or consists of a cathode material. The cathode material includes, consists essentially of, or consists of lithium. The separator contains an electrolyte material. The separator includes, consists essentially of, or consists of (i) one or more sheets of silica fibers, and (ii) a polymeric layer.

Embodiments of the invention may include one or more of the following in any of a variety of combinations. The anode material may include, consist essentially of, or consist of graphene, amorphous carbon, and/or graphite. The cathode material may include, consist essentially of, or consist of a lithium metal oxide and/or a lithium metal phosphate. The electrolyte material may include, consist essentially of, or consist of an organic solvent and a lithium salt. The electrolyte material may include, consist essentially of, or consist of a lithium salt. The separator may include, consist essentially of, or consist of (i) a first sheet of silica fibers, (ii) a second sheet of silica fibers, and (iii) a polymeric layer disposed between the first and second sheets of silica fibers.

The one or more sheets of silica fibers may be formed at least in part by electrospinning a sol-gel. The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Producing the sol-gel may include transitioning the initial sol for at least 2 days under conditions where humidity is within the range of about 40% to about 80%, and the temperature is within the range of 50° F. to 90° F. The initial sol may be allowed to transition for at least 3 days, at least 4 days, at least 5 days, at least 6 days, or at least 7 days. The initial sol may be allowed to transition for 2 days to 10 days, and for 2 days to 7 days in some embodiments. The sol-gel may be electrospun when the weight is at from 20% to 40% of the starting weight of the initial sol or sol-gel before ripening (transitioning). The sol-gel may be electrospun when the production of ethylene vapor is 10% to 20% relative to the peak production of ethylene vapors during ripening (transitioning) of the initial sol or sol-gel before ripening. The sol-gel may be electrospun when the production of ethylene vapor therefrom is 10% to 40% relative to the initial sol or sol-gel before ripening (transitioning).

The anode material may include, consist essentially of, or consist of a first silica fiber powder and a carbon additive. The first silica fiber powder may be formed by a process including, consisting essentially of, or consisting of (i) electrospinning a sol-gel to form a mat of silica fibers, and (ii) fragmenting the mat to form silica fiber powder. The silica fiber powder may include, consist essentially of, or consist of particles and/or fibrous fragments that may have an average size (e.g., average diameter, length, width, or other dimension) ranging from approximately 20 µm to approximately 200 µm. The silica fiber powder may include, consist essentially of, or consist of a plurality of fibrous fragments each composed of a plurality of silica fibers or portions thereof. The fibers or portions thereof within the silica fiber powder may have a variable diameter of from about 50 nm to about 5 µm. The fibers or portions thereof within the silica fiber powder may have a variable diameter of from about 200 nm to about 1000 nm. The silica fiber powder may consist essentially of or consist of $SiO_2$.

The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Forming the anode region may include incorporating the carbon additive into the sol-gel before electrospinning thereof, whereby the silica fiber mat includes the carbon additive incorporated therewithin. Forming the anode region may include incorporating the carbon additive onto the silica fibers during electrospinning thereof. Forming the anode region may include incorporating the carbon additive onto the mat of silica fibers prior to fragmentation thereof. Forming the anode region may include, after fragmentation of the silica fiber mat, incorporating the carbon additive onto the silica fiber powder.

The cathode material may include, consist essentially of, or consist of a second silica fiber powder and a lithium additive. The second silica fiber powder may be formed by a process including, consisting essentially of, or consisting of (i) electrospinning a sol-gel to form a mat of silica fibers, and (ii) fragmenting the mat to form silica fiber powder. The silica fiber powder may include, consist essentially of, or consist of particles and/or fibrous fragments that may have an average size (e.g., average diameter, length, width, or other dimension) ranging from approximately 20 μm to approximately 200 μm. The silica fiber powder may include, consist essentially of, or consist of a plurality of fibrous fragments each composed of a plurality of silica fibers or portions thereof. The fibers or portions thereof within the silica fiber powder may have a variable diameter of from about 50 nm to about 5 μm. The fibers or portions thereof within the silica fiber powder may have a variable diameter of from about 200 nm to about 1000 nm. The silica fiber powder may consist essentially of or consist of $SiO_2$.

The sol-gel may be prepared with tetraethyl orthosilicate (TEOS). Prior to electrospinning the sol-gel, the sol-gel may be produced from an initial sol comprising, consisting essentially of, or consisting of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may contain 70% to 90% TEOS by weight, 8% to 25% ethanol by weight, an acid catalyst, and the balance water. The initial sol may comprise, consist essentially of, or consist of 70% to 90% TEOS by weight, 8% to 25% ethanol by weight, an acid catalyst, and water. The initial sol may comprise, consist essentially of, or consist of 70% to 90% TEOS by weight, 8% to 25% ethanol by weight, 1% to 10% water by weight, and the acid catalyst. The initial sol may comprise, consist essentially of, or consist of 75% to 85% by weight TEOS, 12% to 20% by weight ethanol, and about 2% to 5% by weight water. The initial sol may comprise, consist essentially of, or consist of about 80% by weight TEOS, about 17% by weight ethanol, and about 3% by weight water. The acid catalyst may comprise, consist essentially of, or consist of HCl. The initial sol may contain less than about 0.1% of the acid catalyst by weight. The initial sol may contain from 0.02% to 0.08% of the acid catalyst by weight. The initial sol may contain one or more reagents that alter one or more properties of the initial sol, the sol-gel, and/or the silica fibers.

Forming the cathode region may include incorporating the lithium additive into the sol-gel before electrospinning thereof, whereby the silica fiber mat includes the lithium additive incorporated therewithin. Forming the cathode region may include incorporating the lithium additive onto the silica fibers during electrospinning thereof. Forming the cathode region may include incorporating the lithium additive onto the mat of silica fibers prior to fragmentation thereof. Forming the cathode region may include, after fragmentation of the silica fiber mat, incorporating the lithium additive onto the silica fiber powder.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately," "about," and "substantially" mean±10%, and in some embodiments, ±5%. The term "consists essentially of" means excluding other materials that contribute to function, unless otherwise defined herein. Nonetheless, such other materials may be present, collectively or individually, in trace amounts. Unless otherwise indicated, charge-storage devices such as batteries, materials, mixtures, regions, and other structures described herein may incorporate unintentional impurities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
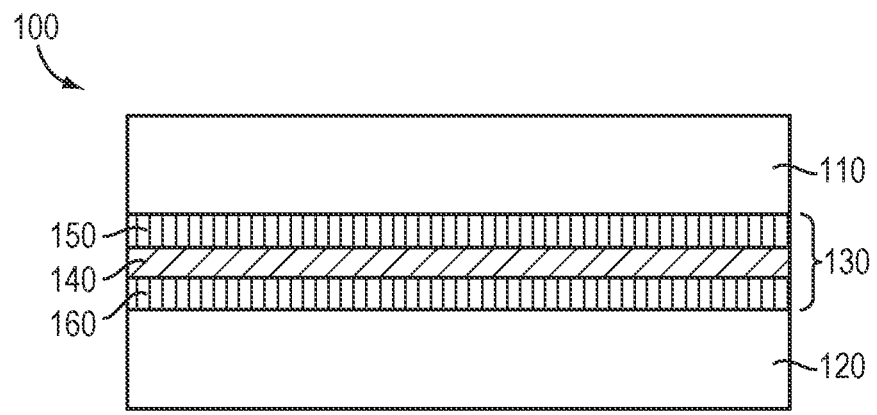
FIG. 1A is a cross-sectional schematic of a battery in accordance with embodiments of the present invention.

In accordance with various embodiments of the present invention, silica fibers and/or powder formed therefrom are utilized as the structural matrix (or at least a portion thereof) for various components of a battery or other charge-storage device (e.g., a supercapacitor). Various components of the battery incorporate other materials mixed with, applied to, and/or incorporated within the silica fibers in order to enable electrochemical charge storage and conductivity of the battery. The silica fibers themselves may be produced from a gelatinous material that is electrospun to form a fiber mat. The mat itself (or a portion thereof) may be utilized within the battery, with or without additional processing (e.g., pressing and/or incorporation of an additive material). In various embodiments, the mat is fragmented into a powder or dust, which may include, consist essentially of, or consist of fibrous fragments. The powder, which may already incorporate one or more additive materials introduced before, during, or after the fiber electrospinning process, may be utilized in one or more regions of the batteries. In various embodiments, the powder is mixed with one or more additives for use in one or more battery regions. In other embodiments, the powder is pressed into a planar sheet and utilized within the battery, with or without the incorporation of one or more additives.

In some embodiments, silica fibers and/or fiber mats are electrospun from a gelatinous material. For example, the silica fibers and/or fiber mats may be prepared by electrospinning a sol-gel, which may be prepared with a silicon alkoxide reagent, such as tetraethyl ortho silicate (TEOS), alcohol solvent, and an acid catalyst.

In some embodiments, the sol-gel for preparing the silica fiber composition is prepared by a method that includes preparing a first mixture containing an alcohol solvent, a silicon alkoxide reagent such as tetraethylorthosilicate (TEOS); preparing a second mixture containing an alcohol solvent, water, and an acid catalyst; fully titrating the second mixture into the first mixture; and processing (ripening) the combined mixture to form a gel for electrospinning. In some embodiments, the silicon alkoxide reagent is TEOS. Alternative silicon alkoxide reagents include those with the formula $Si(OR)_4$, where R is from 1 to 6, and preferably 1, 2, or 3.

In some embodiments, the sol comprises, consists essentially of, or consists of about 70% to about 90% by weight silicon alkoxide (e.g., TEOS), about 5% to about 25% by weight alcohol solvent (e.g., anhydrous ethanol), an acid catalyst (e.g., less than about 0.1% by weight when using HCl) and water. Any sol or sol-gel described herein may include the balance water (i.e., water may constitute any amount of the sol or sol-gel that is otherwise unspecified). Any sol or sol-gel described herein may optionally contain one or more reagents or additives that may or do alter one or more properties of the sol, the sol-gel, and/or the silica fibers (and/or powder prepared therefrom). Such reagents may include, but are not limited to, for example, polymers and polymeric solutions, inert reagents, alcohols, organic and/or aqueous solvents, organic salts, inorganic salts, metals, metal oxides, metal nitrides, metal oxynitrides, carbon (e.g., graphene, graphite, amorphous carbon, fullerenes, etc.), etc.

In some embodiments, the sol contains 70% to 90% tetraethyl orthosilicate (TEOS) by weight, 8% to 25% ethanol by weight, 1% to 10% water by weight, and an acid catalyst. In some embodiments, the sol contains 75% to 85% by weight TEOS, 12% to 20% by weight ethanol, and about 2% to 5% by weight water. An exemplary sol contains about 80% by weight TEOS, about 17% by weight ethanol, and about 3% by weight water. In some embodiments, the acid catalyst is HCl. For example, the sol may contain less than about 0.1% HCl by weight. For example, the sol may contain from 0.02% to 0.08% HCl by weight. In various embodiments, the sol does not contain an organic polymer, or other substantial reagents, such that the fiber composition will be substantially pure $SiO_2$. In various embodiments, the sol does not include inorganic salts (e.g., sodium chloride, lithium chloride, potassium chloride, magnesium chloride, calcium chloride, and/or barium chloride), nor are, in various embodiments, inorganic salts mixed with other components of the sol or into the sol itself. In various embodiments, the fiber composition does not include metals or metal oxides (e.g., $TiO_2$ or $ZrO_2$). In various embodiments, the fiber composition consists essentially of $SiO_2$, i.e., contains only $SiO_2$ and unintentional impurities, and, in some embodiments, species and/or complexes resulting from the incomplete conversion of the sol to $SiO_2$ (e.g., water and/or chemical groups such as ethoxy groups, silanol groups, hydroxyl groups, etc.). In various embodiments, additives may be incorporated onto silica fibers and or powder prepared therefrom after the electrospinning process.

In some embodiments, the alcohol solvent is an anhydrous denatured ethanol, or in some embodiments, methanol, propanol, butanol or any other suitable alcohol solvent. The first mixture may be agitated, for example, using a magnetic stirrer, vibration platform or table, or other agitation means. The second mixture contains an alcohol solvent, water, and an acid catalyst. The alcohol solvent may be an anhydrous denatured alcohol, or may be methanol, propanol, butanol or any other suitably provided alcohol solvent. Water may be distilled water or deionized water. Enough acid catalyst is added to the mixture to aid in the reaction. This acid catalyst may be hydrochloric acid, or may be sulfuric acid or other suitable acid catalyst. The second mixture may be agitated, for example, magnetic stirrer, vibration platform or table, or other agitation means. In some embodiments, the first mixture (or sol) and the second mixture (or sol) are created without the use of direct heat (i.e., heat applied via extrinsic means such as a hot plate or other heat source).

According to various embodiments, the first mixture and the second mixture are combined by dripping or titrating the second mixture into the first mixture, preferably with agitation. The combined mixture is then further processed by allowing the sol to ripen in a controlled environment until a substantial portion of the alcohol solvent has evaporated to create a sol-gel suitable for electrospinning. For example, the controlled environment may include an enclosure with at least one vent and optionally a fan to draw gases away from the mixture, and which may involve controlled conditions in terms of humidity, temperature, and optionally barometric pressure. For example, the humidity may be controlled (e.g., via use of conventional humidifiers and/or dehumidifiers) within the range of about 30% to about 90%, such as from about 40% to about 80%, or in some embodiments, from about 50% to about 80%, or from about 50% to about 70% (e.g., about 55%, or about 60%, or about 65%). Some humidity may be helpful to slow evaporation of solvent, and thereby lengthen the window for successful electrospinning. In some embodiments, the temperature is in the range of from about 50° F. to about 90° F., such as from about 60° F. to about 80° F., or from about 65° F. to about 75° F. In various embodiments, the sol is not exposed to heat over 150° F. or heat over 100° F., so as to avoid accelerating the transition. In some embodiments, barometric pressure is optionally controlled (e.g., using a low pressure vacuum source such as a pump or a fan). By controlling the environmental conditions during ripening, the time period during which the gel may be electrospun may be lengthened; this time period may be a small window of only several minutes if the ripening process is too accelerated, such as with direct heat. When ripening the sol at a constant humidity of about 55% and temperature of about 72° F., the sol will ripen (gelatinize) in a few days, and the window for successful electrospinning may be expanded to at least several hours, and in some embodiments several days. In various embodiments, the ripening process takes at least 2 days, or at least 3 days in some embodiments. However, in various embodiments the ripening does not take more than 10 days, or more than 7 days. In some embodiments, the ripening process takes from 2 to 10 days, or from 2 to 7 days, or from 2 to 5 days, or from 2 to 4 days (e.g., about 2, about 3, or about 4 days). In various embodiments, the sol-gel is spinnable well before it transitions into a more solidified, non-flowable mass.

The enclosure space for ripening the sol-gel may include a vent on at least one surface for exhausting gases from within the enclosure, and optionally the vent may include a fan for exhausting gases produced during the ripening process. The enclosure space may optionally include a heating source (e.g., one or more heating elements, for example resistive heating elements) for providing a nominal amount of heat within the enclosure space, to maintain a preferred temperature. In some embodiments, a source of humidity (e.g., an open container of water or other aqueous, water-based liquid) is provided within the enclosure environment to adjust the humidity to a desired range or value. The enclosure may further include one or more environmental monitors, such as a temperature reading device (e.g., a thermometer, thermocouple, or other temperature sensor) and/or a humidity reading device (e.g., a hygrometer or other humidity sensor).

In some embodiments, the sol-gel is electrospun after a ripening process of at least 2 days, or at least 36 hours, or at least 3 days, or at least 4 days, or at least 5 days at the controlled environmental conditions (but in various embodiments, not more than 10 days or not more than 7 days under the controlled environmental conditions). By slowing the ripening process, the ideal time to spin the fibers can be identified. The weight of the sol-gel may be used as an indicator of when the sol-gel is at or near the ideal time to electrospin. Without intending to be bound by theory, it is believed that the viscosity of the sol-gel is a poor determinant for identifying the optimal time for electrospinning. For example, in various embodiments, the sol-gel is from about 10% to about 60% of the original weight of the sol (based on loss of alcohol solvent during transitioning). In some embodiments, the sol-gel is from 15 to 50% of the original weight of the sol, or in the range of about 20 to about 40% of the original weight of the sol.

In some embodiments, the sol-gel is ripened for at least 2 days, or at least 36 hours, or at least 3 days, or at least 4 days, or at least 5 days, and is electrospun when the ethylene vapors produced by the composition are between about 10% and about 40% of the vapors produced by the starting sol, such as in the range of about 10% and about 25%, or in the range of about 10% to about 20%. Ethylene is a colorless flammable gas with a faint sweet and musky odor (which is clearly evident as solvent evaporation slows). Ethylene is produced by the reaction of ethanol and acid. Ethylene may optionally be monitored in the vapors using a conventional ethylene monitor. In other embodiments, gases produced by the sol during the sol ripening process are monitored to determine a suitable or optimal time for electrospinning. Gas profiles may be monitored using gas chromatography.

In various embodiments, additives such as carbon additives and/or lithium additives may be introduced into the sol-gel prior to electrospinning, and such additives may therefore be incorporated into and/or onto the spun fibers. In various embodiments, the additive is introduced into the sol-gel immediately prior to (e.g., less than 0.5 hour before, less than 1 hour before, less than 2 hours before, or less than 5 hours before) electrospinning so that the sol-gel successfully ripens prior to introduction of the additive, facilitating successfully electrospinning. In various embodiments, the additive may be introduced into the sol-gel after it has ripened for at least 0.5 days, at least 1 day, at least 2 days, or at least 3 days.

In various embodiments, the sol-gel may be ripened for a shorter period of time, as long as the sol-gel remains spinnable via electrospinning. The resulting silica fiber mat or collection of fibers may in some cases be more brittle after ripening for a shorter time period, but such brittleness may not prevent the fragmenting of the fibers and production of powder therefrom. In various embodiments, silica fiber powder utilized in one or more regions of the battery may be produced from silica fibers or fiber mats electrospun after ripening for less time than silica fibers or mats utilized within the battery in mat or sheet form. For example, silica fiber powder utilized in one or more regions of the battery may be produced from silica fibers or fiber mats electrospun after ripening for less than 2 days or less than 1 day.

The processing of the sol-gel mixture may require stirring or other agitation of the mixtures at various intervals or continuously due to the development of silicone dioxide crystalline material on the top surface of the mixtures. This development of crystalline material on the top surface slows the processing time and it is believed that the crystalline material seals off exposure of the mixture to the gaseous vacuum provided within the enclosure space. In some embodiments, any solid crystalline material is removed from the mixture.

Upon completion of the sol-gel process, the sol-gel is then electrospun using any known technique. The sol or sol-gel may be preserved (e.g., frozen or refrigerated) if needed (and such time generally will not apply to the time for ripening). An exemplary process for electrospinning the sol-gel is described in Choi, Sung-Seen, et al., *Silica nanofibers from electrospinning/sol-gel process, Journal of Materials Science Letters* 22, 2003, 891-893, which is hereby incorporated by reference in its entirety. Exemplary processes for electrospinning are further disclosed in U.S. Pat. No. 8,088,965, which is hereby incorporated by reference in its entirety.

In an exemplary electrospinning technique, the sol-gel is placed into one or more syringe pumps that are fluidly coupled to one or more spinnerets. The spinnerets are connected to a high-voltage (e.g., 5 kV to 50 kV) source and are external to and face toward a grounded collector drum. The drum rotates during spinning, typically along an axis of rotation approximately perpendicular to the spinning direction extending from the spinnerets to the drum. As the sol-gel is supplied to the spinnerets from the syringe pumps (or other holding tank), the high voltage between the spinnerets and the drum forms charged liquid jets that are deposited on the drum as small entangled fibers. As the drum rotates and electrospinning continues, a fibrous mat of silica fibers is formed around the circumference of the drum. In various embodiments, the spinnerets and syringe pump(s) may be disposed on a movable platform that is movable parallel to the length of the drum. In this manner, the length along the drum of the resulting fiber mat may be increased without increasing the number of spinnerets. The diameter of the drum may also be increased to increase the areal size of the electrospun mat. The thickness of the mat may be largely dependent upon the amount of sol-gel used for spinning and thus the amount of electrospinning time. For example, the mat may have a thickness of greater than about ⅛ inch, or greater than about ¼ inch, or greater than about ⅓ inch, or greater than about ½ inch.

After completion of the electrospinning process, the resulting mat is removed from the drum. For example, the mat may be cut and peeled away from the drum in one or more pieces. The mat may then be fragmented to form a powder. In various embodiments, the powder includes, consists essentially of, or consists of small fibrous fragments that are each intertwined collections of silica fibers, rather than unitary solid particles. In some embodiments, the electrospun mat may be fractured, cut, ground, milled, or otherwise divided into small fragments that maintain a fibrous structure. In some embodiments, the mat (or one or more portions thereof) is rubbed through one or more screens or sieves, and the mesh size of the screen determines, at least in part, the size of the resulting fibrous fragments or powder or dust produced from the electrospun mat. For example, the mat or mat portions may be rubbed through a succession of two or more screens having decreasing mesh sizes (e.g., screens having mesh numbers of 100, 200, 300, or even 400), in order to produce a powder or dust or collection of fibrous fragments having the desired sizes.

In various embodiments, one or more additives are introduced onto the silica fibers during the electrospinning process. For example, a slurry containing the material (e.g., in powder or particulate form) may be sprayed or misted onto the fibers between the spinnerets and the drum or as formed on the drum itself. In various embodiments, the slurry contains one or more additives selected for the desired region of the battery in solution with a carrier such as water and/or an organic liquid such as propylene carbonate. Batteries in accordance with embodiments of the invention may also incorporate one or more regions or sheets of the spun silica fibers (or powder produced therefrom) without the additive(s).

In various embodiments, the additive may be added into the sol-gel, for example in particulate or powder form, or as a slurry or mixture, prior to spinning of the silica fibers, and the as-spun fibers will incorporate the additive therein or thereon. In various embodiments, the additive is added into the sol-gel after at least a portion of the ripening time.

In other embodiments, the additive is incorporated onto the silica fibers and/or powder after the fibers or fiber mats are spun. After completion of the electrospinning process, the resulting mat is removed from the drum. For example, the mat may be cut and peeled away from the drum in one or more pieces. The mat may be cut to size, if desired or necessary, and the electrospun mat of silica fibers may be coated with one or more additives to form a region of the battery or other charge-storage device. For example, the additive may be deposited over the silica fibers via techniques such as electrodeposition from a solution containing the additive, atomic layer deposition, chemical vapor deposition, or spraying or misting of a solution containing one or more additives selected for the desired region of the battery along with a carrier such as water and/or a polymeric binder. In various embodiments, the silica fibers or mat is processed into silica fiber powder, and the additive is deposited on the powder (via, e.g., any of the above techniques) and/or mixed with the powder.

Figure 1B:
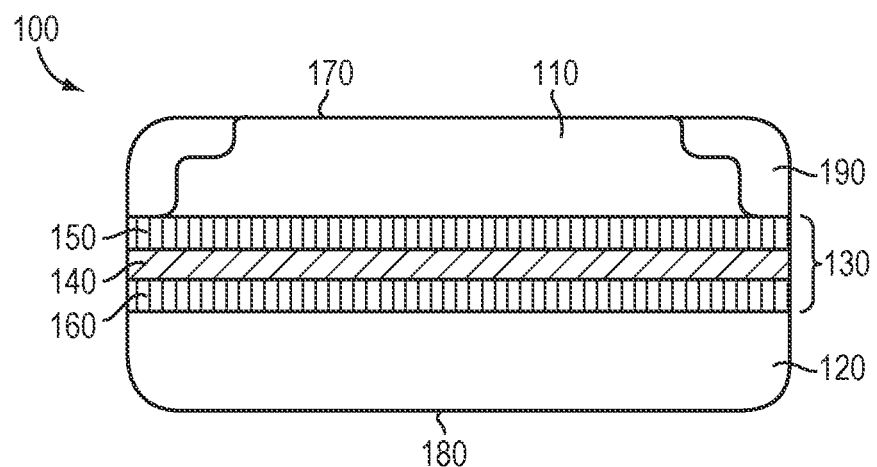
FIG. 1B is a cross-sectional schematic of a battery having a coin cell form factor in accordance with embodiments of the present invention.
Figure 2A:
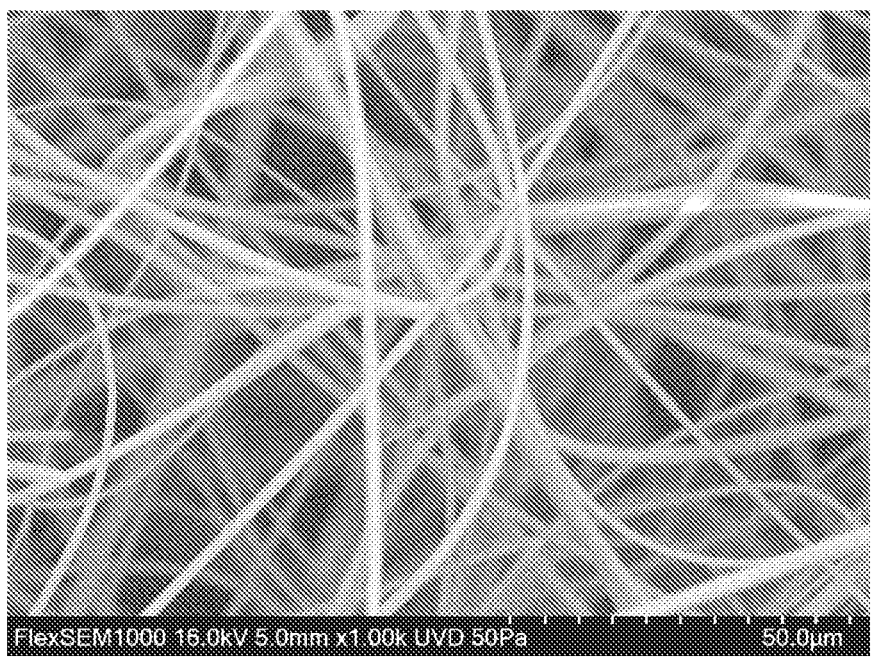
FIGS. 2A-2D are scanning electron microscopy (SEM) images of fibers spun in accordance with embodiments of the present invention. Images in FIGS. 2A-2D are at, respectively, 50, 100, 200, and 500 micron scale.
Figure 2B:
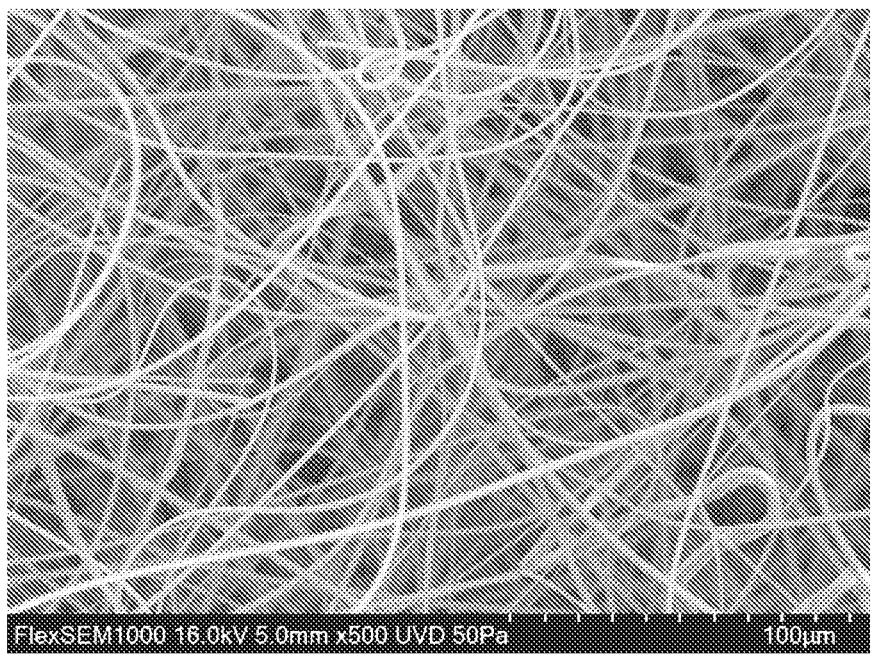
Figure 2C:
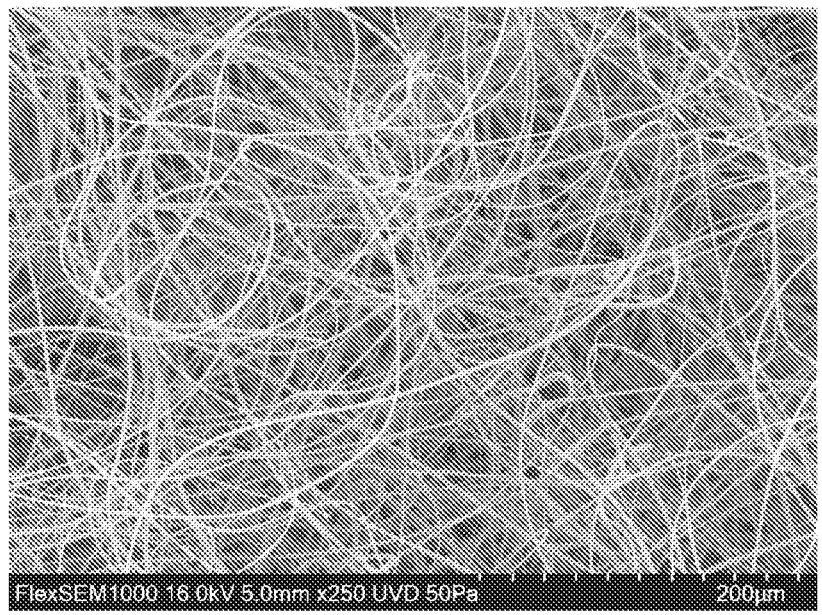
Figure 2D:
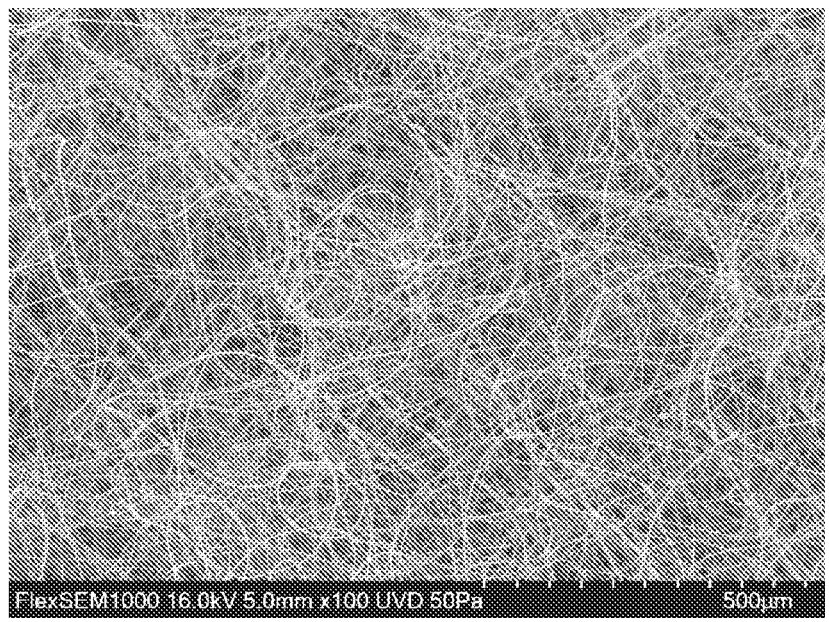

FIG. 1A is a schematic of a battery 100 in accordance with embodiments of the invention. As shown, the battery 100 features an anode region 110, a cathode region 120, and a separator 130 located between the anode region 110 and the cathode region 120. In the depicted embodiment, the separator 130 includes a polymer layer 140, a first silica fiber sheet 150, and a second silica fiber sheet 160. However, various embodiments of the invention lack first silica fiber sheet 150 and/or second silica fiber sheet 160. FIG. 1B is a cross-sectional schematic of a battery 100 having a coin cell form factor. As shown, the battery 100 is disposed within an enclosure or housing that includes a top portion 170, corresponding to the negative battery terminal, and a bottom portion 180, corresponding to the positive battery terminal. As such, portions 170, 180 may be electrically conductive and may be electrically connected to the anode 110 and cathode 120. Housing portions 170, 180 may therefore provide for powering external loads and/or for recharging the battery 100 via application of electrical current from an external power source. A seal 190 may be present to facilitate sealing of the enclosure.

In various embodiments, the anode region 110 includes, consists essentially of, or consists of silica fiber powder and a carbon additive (e.g., silica fiber powder with a carbon additive incorporated thereon). For example, the carbon additive may include, consist essentially of, or consist of graphene, amorphous carbon, and/or graphite. In other embodiments, e.g., embodiments featuring silica fiber powder and/or sheets in other regions of the battery, the anode region 110 is substantially free of silica fiber powder; for example, the anode region 110 may include, consist essentially of, or consist of the carbon additive (e.g., in powder or pressed powder/solid form) with or without another carrier.

In various embodiments of the invention, the anode region 110 may be prepared by mixing the desired ingredients with a binder and/or a solvent to form a homogenous slurry. The slurry may be cast on a flat surface (e.g., a metal (e.g., copper) sheet or foil and/or a glass sheet) and spread to a uniform thickness. The slurry may then be dried to evaporate and substantially remove the binder and/or solvent. In various embodiments, trace amounts (e.g., less than 0.1%, less than 0.01%, or less than 0.001% by weight or volume) of the binder and/or solvent may be present in the final anode region 110. The coated metal foil may be cut (e.g., punched) into the desired size and shape (e.g., discs) to form the anode region 110, which may be assembled with the cathode region 120 and the separator 130.

In various embodiments, the cathode region 120 includes, consists essentially of, or consists of silica fiber powder and a lithium additive (e.g., silica fiber powder with a lithium additive incorporated thereon). For example, the lithium additive may include, consist essentially of, or consist of a lithium metal oxide (e.g., a lithium transition metal oxide such as lithium cobalt oxide or lithium manganese oxide) or a lithium metal phosphate (e.g., lithium iron phosphate). Exemplary lithium additives in accordance with embodiments of the present invention include lithium metal oxides such as lithium cobalt oxide, and/or lithium manganese oxide, and/or lithium metal phosphates such as lithium iron phosphate. In various embodiments, lithium additives include, consist essentially of, or consist of lithium metal oxide salts such as $LiNiMnCoO_2$ (NMC), $LiNiCoAlO_2$ (NCA), $LiCoO_2$ (LCO), $LiFePO_4$ (LFP), etc. In other embodiments, e.g., embodiments featuring silica fiber powder and/or sheets in other regions of the battery, the cathode region 120 is substantially free of silica fiber powder; for example, the cathode region 120 may include, consist essentially of, or consist of the lithium additive (e.g., in powder or pressed powder/solid form) with or without another carrier. In various embodiments, the cathode region 120 may also include a carbon additive such as amorphous or graphitic carbon.

In various embodiments of the invention, the cathode region 120 may be prepared by mixing the desired ingredients with a binder and/or a solvent to form a homogenous slurry. The slurry may be cast on a flat surface (e.g., a metal (e.g., aluminum) sheet or foil and/or a glass sheet) and spread to a uniform thickness. The slurry may then be dried to evaporate and substantially remove the binder and/or solvent. In various embodiments, trace amounts (e.g., less than 0.1%, less than 0.01%, or less than 0.001% by weight or volume) of the binder and/or solvent may be present in the final cathode region 120. The coated metal foil may be cut (e.g., punched) into the desired size and shape (e.g., discs) to form the cathode region 120, which may be assembled with the anode region 110 and the separator 130.

The separator 130 may include, consist essentially of, or consist of a polymer layer 140 that is typically porous to enable charge transfer (e.g., via flow of ionic charge carriers). For example, pores in the polymer layer 140 may range in size from approximately 5 nm to approximately 100 nm. Polymer layers 140 may include, consist essentially of, or consist of, for example, one or more polymeric materials such as polyethylene, polypropylene, polytetrafluoroethylene, polyvinyl chloride, and/or polymer blends including one or more of these with or without one or more other polymeric materials.

As shown in FIGS. 1A and 1B, in various embodiments, separators 130 may additionally incorporate one or more sheets of silica fibers 150, 160. For example, first silica fiber sheet 150 may be disposed between (and, e.g., in direct mechanical contact with) the polymer layer 140 and the anode region 110, and/or second silica fiber sheet 160 may be disposed between (and, e.g., in direct mechanical contact with) the polymer layer 140 and the cathode region 120. In various embodiments, the incorporation of one or more sheets of silica fibers 150, 160 provides the polymer layer 140 with protection from thermal decomposition and/or deformation, enhances mechanical integrity of the structure inside the battery 100, and/or improves ion mobility within the battery 100.

In various embodiments, for example those incorporating one or more silica fiber sheets 150, 160, the battery 100 may be substantially free of silica fibers and/or silica fiber powder within the anode region 110 and/or the cathode region 120.

In various embodiments, the separator 130 incorporates an electrolyte material that enables charge transfer between the anode region 110 and the cathode region 130 via ionic charge transfer. For example, the electrolyte material may include, consist essentially of, or consist of a mixture of an organic solvent (e.g., ethylene, dimethyl/ethyl carbonates, and/or N-methyl-2-pyrrolidone) with one or more ionic conductors (e.g., lithium salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), or lithium triflate ($LiCF_3SO_3$)).

EXAMPLES

Example 1

Preparation of Silica Fiber Mat

Silica fibers were prepared using an electrospinning process, in which a sol-gel was spun onto a collector drum to form a non-woven mat of fibers. The sol-gel was made in two parts. First, TEOS was mixed with ethanol, and then a second mixture containing HCl, water, and ethanol was titrated into the mixture. The sol-gel was then allowed to ripen for a few days under controlled conditions before spinning.

In one example, the first sol was made by weighing out 384 grams of TEOS 98% and 41.8 grams of anhydrous denatured ethanol, and pouring together. The first sol was allowed to let stand in a beaker, and a magnetic stirrer was used to create a homogenous solution. The second sol was made by weighing 41.8 grams of anhydrous denatured ethanol, 16.4 grams of distilled water, and 0.34 grams of hydrochloric acid, which was then poured together and mixed for 8 seconds with a magnetic stirrer until a homogenous second sol was formed.

The second sol was then poured into the titration device, which was placed above a beaker containing the first sol. The titration device then dripped about 5 drops per second until a third sol was formed via the mixing of the first sol and the second sol. During the dripping process, the first sol was continuously mixed with a magnetic stirrer while the second sol was dripped into the first sol.

The combined third sol was then placed into an enclosure box. A low pressure vacuum was provided by a fan on medium speed to remove fumes. The air temperature within the box was 72° F. with 60% humidity. The third sol was allowed to sit and process for about three days. The mixtures were agitated daily to reduce the build-up of crystalline structures. The third sol began to transition to sol-gel with evaporation of the alcohol solvent. Sol-gel may be monitored to determine an approximate amount of $C_2H_4$ (ethylene) in the vapors, which may be in the range of about 10-20% relative to that of the original sol before ripening. Upon proper gelatinization, the sol-gel was loaded into electrospinning machine or was frozen to preserve for electrospinning. In this example, proper gelatinization occurred when the total mass of the sol-gel was between about 70 grams and about 140 grams. This example may be scaled appropriately and the ranges may vary, yet still produce desirable structures. To further identify the ideal time to electropsin, portions of the gel may be dripped into the electric field of the spinning apparatus to evaluate the spinning properties of the sol-gel.

Figure 3:
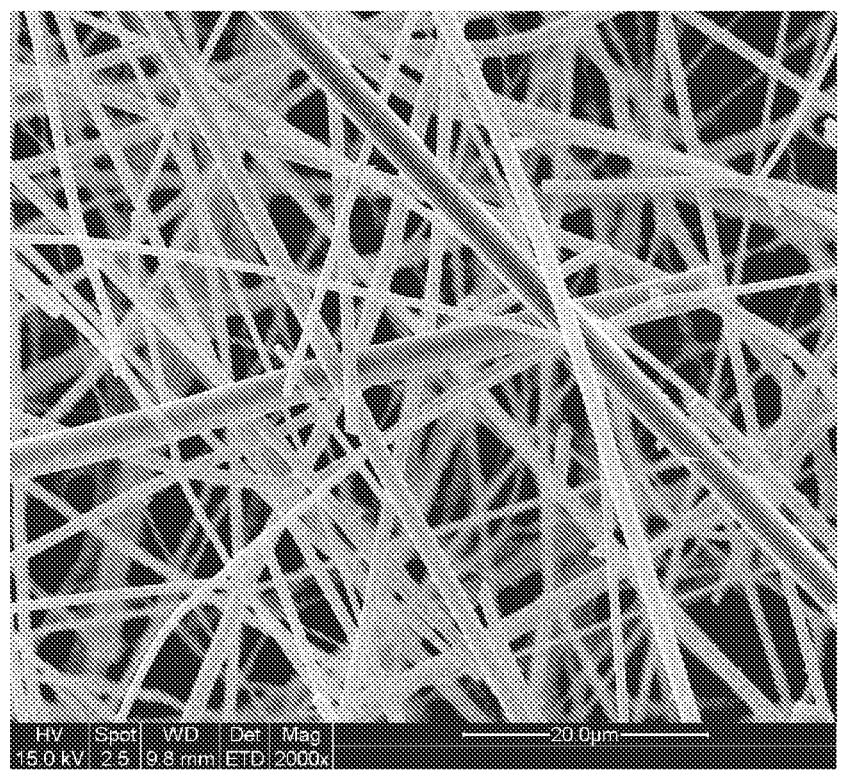
FIG. 3 shows an SEM image (20 micron scale is shown) of fibers spun in accordance with embodiments of the present invention after less ripening time than the figures shown in FIGS. 2A-2D.
Figure 4:
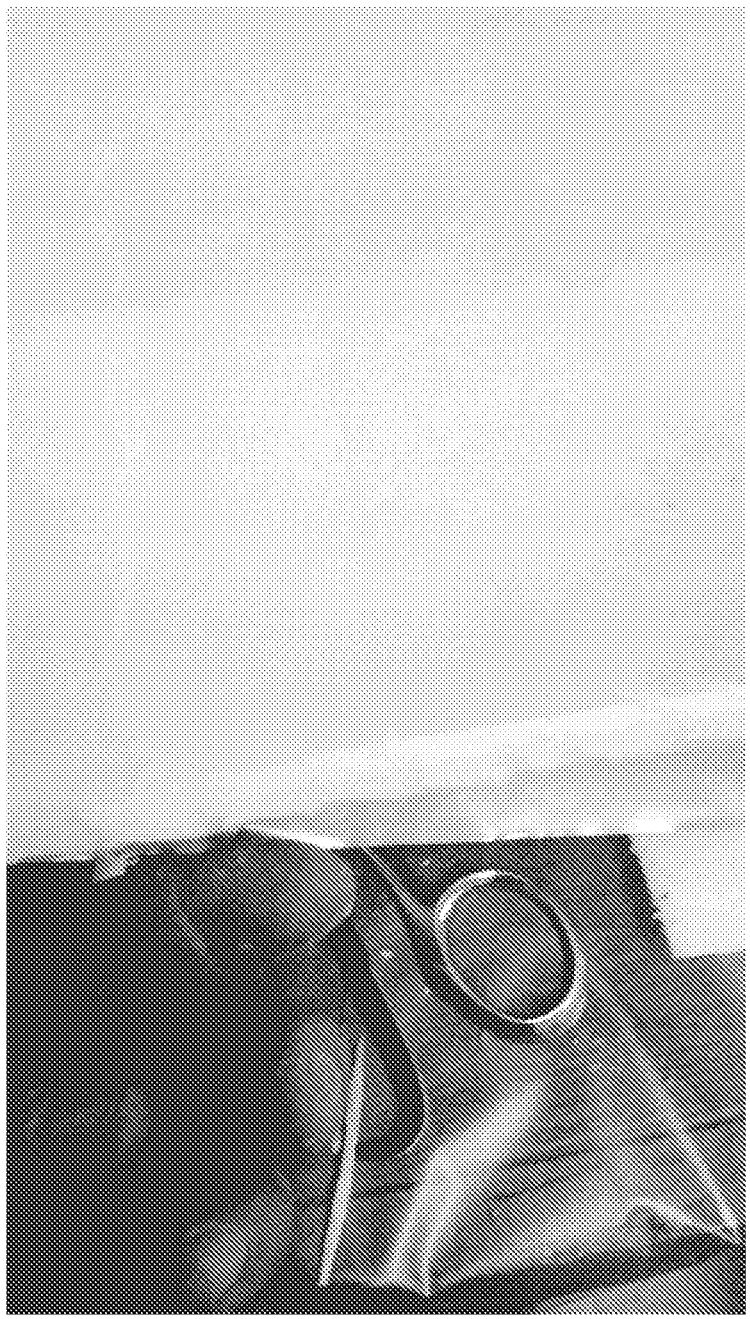
FIG. 4 shows a fiber mat spun with a thickness of about ¼ inch in accordance with embodiments of the present invention.

FIGS. 2A-2D are scanning electron microscopy (SEM) images of fibers spun in accordance with embodiments of the invention (50, 100, 200, and 500 micron scales shown). As shown, the fibers are flexible, smooth, dense, and continuous (not significantly fractured). FIG. 3 is an SEM image of fibers that were electrospun after less ripening time (20 micron scale shown), where the fibers are clearly rigid with many fractures clearly evident. Such fibers, in various embodiments, may be more brittle and more easily processed into silica fiber powder. FIG. 4 shows a fiber mat spun in accordance with embodiments of the invention. The flexibility and continuity of the fibers allows mats to be spun at a thickness of ¼ inch or more. The mat has a soft, flexible texture.

Figure 5A:
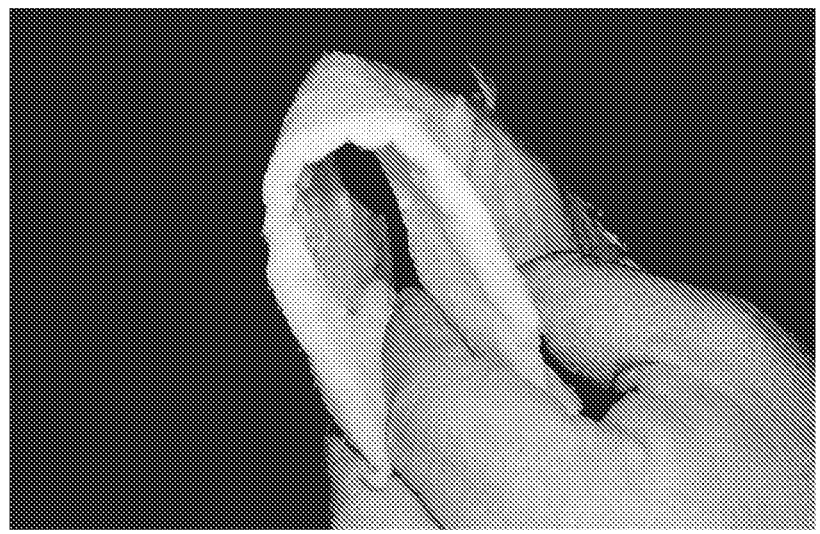
FIGS. 5A and 5B compare a silica fiber mat that was electrospun after a longer transitioning time in accordance with embodiments of the present invention (FIG. 5A), with a fiber mat electospun after a shorter transition time in accordance with other embodiments of the present invention (FIG. 5B).
Figure 5B:
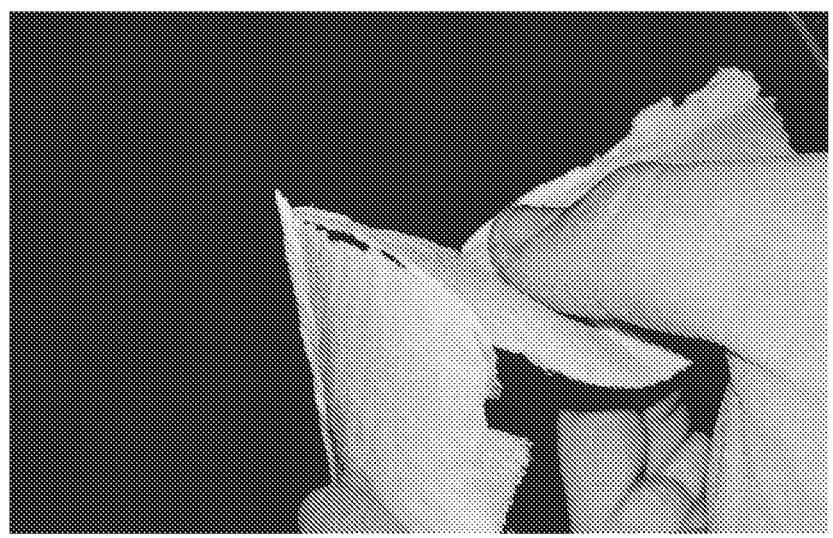

FIGS. 5A and 5B are images depicting the variation of properties of silica fiber mats as a function of ripening time. The mat of FIG. 5A is illustrative of mats electrospun for at least 2-3 days in accordance with embodiments of the invention, while the mat of FIG. 5B is illustrative of mats electrospun after less ripening time. The material in FIG. 5A has a soft texture and is very flexible; such material may still be processed into fiber dust or used in sheet form. The material in FIG. 5B is brittle, inflexible, and thin, and may be easily processed into fiber dust.

Figure 6A:
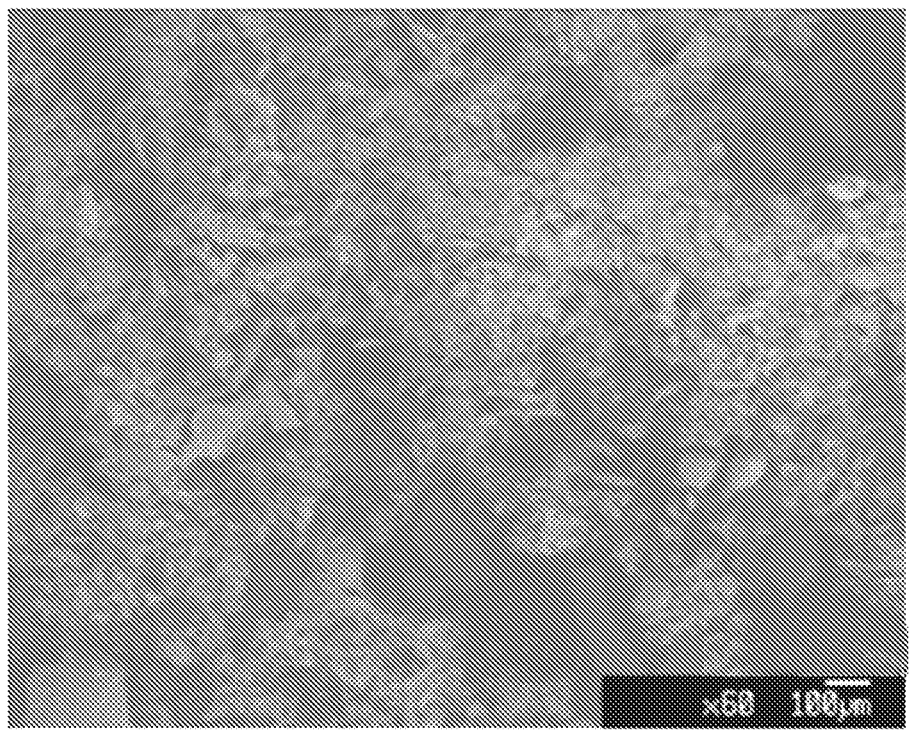
FIGS. 6A and 6B show SEM images of fiber dust in accordance with embodiments of the invention, with 100 μm scale shown.
Figure 6B:
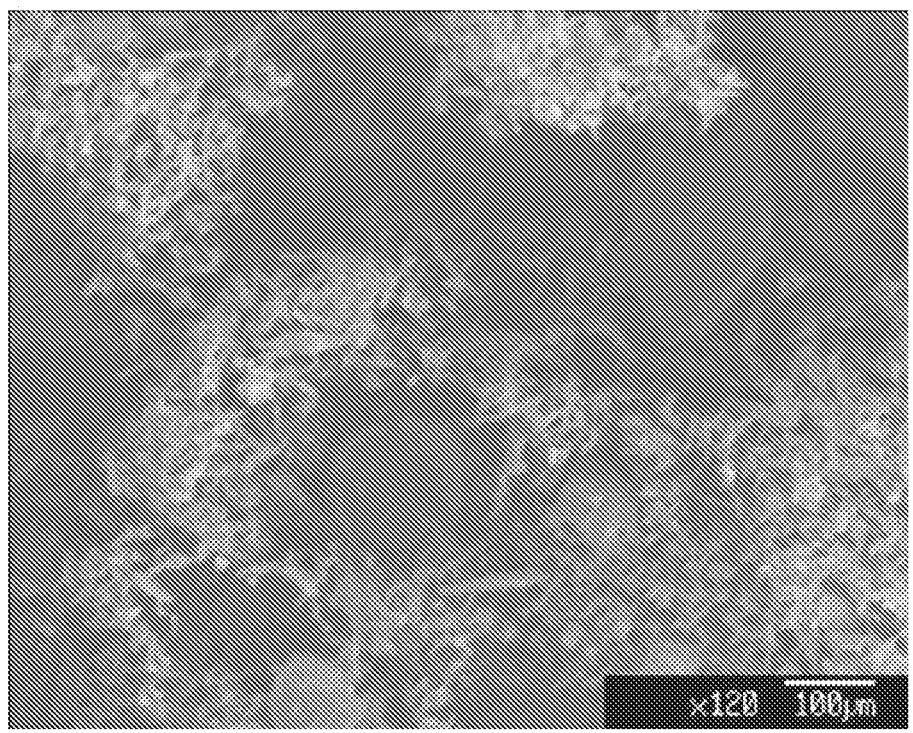

A silica fiber mat was fabricated and broken into fragments by rubbing through a series of screens of decreasing mesh size. The final screen was a 200 mesh screen, resulting in fiber dust and/or fibrous fragments having sizes of approximately 20 µm to approximately 200 µm. FIGS. 6A and 6B show SEM images of the resulting fiber dust, with 100 µm scale shown.

Example 2

Preparation of Coin-Cell Batteries

Cathode materials for batteries were fabricated by mixing appropriate amounts of active material (e.g., one or more lithium metal oxide salts), amorphous or graphitic carbon, and silica fiber powder, which were weighed and mixed with a binder (e.g., PVDF, CMC, SBR, etc.) and a solvent (e.g., NMP) into a homogenous slurry having a suitable viscosity (e.g., to allow subsequent spreading for casting). Exemplary embodiments included, for example, approximately 75% to approximately 80% active material, 0% to approximately 10% amorphous or graphitic carbon, and approximately 0.5% to approximately 10% silica fiber powder prepared as described in Example 1.

The slurry was cast on a clean, bubble-free battery-grade aluminum foil placed on a glass sheet and spread uniformly with a blade. The slurry was dried to remove the binder and solvent. Exemplary drying conditions included, for example, drying temperatures ranging from approximately 80° C. to approximately 120° C. and drying times ranging from approximately 2 hours to approximately 4 hours. The resulting coated metal foil was punched into small discs (e.g., having a diameter ranging from approximately 12 mm to approximately 30 mm) and weighed.

Anode materials for the batteries were fabricated by mixing appropriate amounts of conductive amorphous or graphitic carbon and silica fiber powder, which were weighed and mixed with a binder (e.g., PVDF, CMC, SBR, etc.) and a solvent (e.g., NMP) into a homogenous slurry having a suitable viscosity (e.g., to allow subsequent spreading for casting). The slurry was cast on a clean, bubble-free battery-grade copper foil placed on a glass sheet and spread uniformly with a blade. The slurry was dried to remove the binder and solvent. Exemplary drying conditions included, for example, drying temperatures ranging from approximately 80° C. to approximately 120° C. and drying times ranging from approximately 2 hours to approximately 4 hours. The resulting coated metal foil was punched into small discs (e.g., having a diameter ranging from approximately 12 mm to approximately 30 mm).

Separators for batteries were fabricated by sandwiching a commercially available thin polymer separator sheet between two pressed sheets of silica fibers. The sandwich structure was punched into small discs (e.g., having a diameter ranging from approximately 12 mm to approximately 30 mm). The electrolyte was prepared as a solution of a lithium salt in a non-aqueous solvent (e.g., EC, EMC, DEC, DMC, etc.). Exemplary solvents had concentrations ranging from approximately 0.8 molar concentration to approximately 2 molar concentration (e.g., approximately 1 molar concentration). The solvent was introduced onto and absorbed by the separator sandwich structure.

The batteries were each assembled by sandwiching a separator between an anode and a cathode in a glovebox under an inert (e.g., argon) atmosphere with the metal foils of the anode and cathode each facing away from the separator. The batteries were subsequently tested per industry standards.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

The invention claimed is:

1. A method of fabricating a charge-storage device, the method comprising:
    forming an anode region comprising an anode material, the anode material comprising a silica fiber powder and a carbon additive, wherein forming the anode region comprises (i) electrospinning a sol-gel to form a mat of silica fibers, and (ii) fragmenting the mat to form silica fiber powder;
    forming a cathode region comprising a cathode material, the cathode material comprising lithium; and
    disposing a separator containing an electrolyte material between the anode region and the cathode region.

2. The method of claim 1, wherein forming the anode region comprises incorporating the carbon additive into the sol-gel before electrospinning thereof, whereby the silica fiber mat comprises the carbon additive incorporated therewithin.

3. The method of claim 1, wherein forming the anode region comprises incorporating the carbon additive onto the silica fibers during electrospinning thereof.

4. The method of claim 1, wherein forming the anode region comprises incorporating the carbon additive onto the mat of silica fibers prior to fragmentation thereof.

5. The method of claim 1, wherein forming the anode region comprises, after fragmentation of the silica fiber mat, incorporating the carbon additive onto the silica fiber powder.

6. The method of claim 1, wherein the silica fiber powder consists essentially of $SiO_2$.

7. The method of claim 1, wherein the carbon additive comprises at least one of graphene, amorphous carbon, or graphite.

8. The method of claim 1, wherein the cathode material comprises at least one of a lithium metal oxide or a lithium metal phosphate.

9. The method of claim 1, wherein the electrolyte material comprises an organic solvent and a lithium salt.

10. The method of claim 1, wherein the separator comprises a polymeric layer.

11. A method of fabricating a charge-storage device, the method comprising:
    forming an anode region comprising an anode material, the anode material comprising carbon;
    forming a cathode region comprising a cathode material, the cathode material comprising a silica fiber powder and a lithium additive, wherein forming the cathode region comprises (i) electrospinning a sol-gel to form a mat of silica fibers, and (ii) fragmenting the mat to form silica fiber powder; and
    disposing a separator containing an electrolyte material between the anode region and the cathode region.

12. The method of claim 11, wherein forming the cathode region comprises incorporating the lithium additive into the sol-gel before electrospinning thereof, whereby the silica fiber mat comprises the lithium additive incorporated therewithin.

13. The method of claim 11, wherein forming the cathode region comprises incorporating the lithium additive onto the silica fibers during electrospinning thereof.

14. The method of claim 11, wherein forming the cathode region comprises incorporating the lithium additive onto the mat of silica fibers prior to fragmentation thereof.

15. The method of claim 11, wherein forming the cathode region comprises, after fragmentation of the silica fiber mat, incorporating the lithium additive onto the silica fiber powder.

16. The method of claim 11, wherein the silica fiber powder consists essentially of $SiO_2$.

17. The method of claim 11, wherein the anode material comprises at least one of graphene, amorphous carbon, or graphite.

18. The method of claim 11, wherein the lithium additive comprises at least one of a lithium metal oxide or a lithium metal phosphate.

19. The method of claim 11, wherein the electrolyte material comprises an organic solvent and a lithium salt.

20. The method of claim 11, wherein the separator comprises a polymeric layer.

* * * * *